United States Patent [19]
Siegel

[11] 3,852,263
[45] Dec. 3, 1974

[54] SUBSTITUTED 4-(N-SULPHOALKYLENE-AMINOSULPHONYL)-PHENYL-AZO-PHENYL COMPOUNDS

[75] Inventor: Edgar Siegel, Leverkusen, Germany

[73] Assignee: Bayer Aktiengesellschaft, Leverkusen, Germany

[22] Filed: Jan. 14, 1972

[21] Appl. No.: 217,961

[30] Foreign Application Priority Data
Jan. 15, 1971    Germany............................ 2101685

[52] U.S. Cl................. 260/205, 260/206, 260/207, 260/207.1, 260/207.5, 260/510
[51] Int. Cl............................................ C09b 29/08
[58] Field of Search ........ 260/205, 206, 207, 207.1, 260/207.5

[56] References Cited
UNITED STATES PATENTS
2,694,727    11/1954    Cross et al...................... 260/208 X FOREIGN PATENTS OR APPLICATIONS
482,342    3/1938    Great Britain...................... 260/184
723,090    6/1942    Germany............................ 260/205

OTHER PUBLICATIONS
Colour Index, 2nd Ed., Vol. III, pg. 3039, C.I.13030.

Primary Examiner—Lorraine A. Weinberger
Assistant Examiner—C. F. Warren
Attorney, Agent, or Firm—Plumley & Tyner

[57] ABSTRACT

Monoazo dyestuffs which in the form of the free acid correspond to the general formula $$\begin{array}{c} HO_3S-X \\ \phantom{HO_3S}\diagdown N-O_2S-\!\!\left\langle A \right\rangle\!\!-N\!=\!N\!-\!\!\left\langle B \right\rangle\!\!-N\diagup^{R_3}_{R_4} \\ R_1 \phantom{N-O_2S-\langle A\rangle-N=N-\langle B\rangle-N} R_2 \end{array}$$

in which X signifies a straight-chained or branched alkylene radical with 2 to 4 carbon atoms,
$R_1$ signifies hydrogen or alkyl,
$R_2$ signifies hydrogen, chlorine, alkyl or acylamino,
$R_3$ signifies hydrogen or alkyl and
$R_4$ signifies alkyl,
it being possible for the nuclei A and B to possess further non-ionic substituents, as well as their use for dyeing natural and synthetic fibre materials, especially for dyeing polyamide fibres. Dyeings obtained yield very good fastness to light.

8 Claims, No Drawings

SUBSTITUTED 4-(N-SULPHOALKYLENE&AMINOSULPHONYL)-PHENYL-AZO-PHENYL COMPOUNDS

The present invention relates to new and valuable monoazo dyestuffs which in the form of the free acid correspond to the general formula

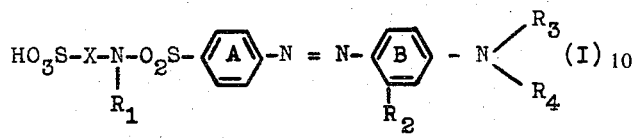

and also to their production and use for dyeing synthetic fibre materials, especially those consisting of polyamides. In the general formula (I)

X signifies a straight-chained or branched alkylene radical with 2 to 4 carbon atoms,
$R_1$ signifies hydrogen or alkyl,
$R_2$ signifies hydrogen, chlorine, alkyl or acylamino,
$R_3$ signifies hydrogen or alkyl and
$R_4$ signifies alkyl.

The nuclei A and B may have further non-ionic substituents, for example halogens such as Cl and Br, lower alkyl such as methyl or ethyl and lower alkoxy such as methoxy or ethoxy.

The alkyl radicals $R_1$ to $R_4$ can if desired be further substituted, for example with hydroxy, cyano, alkoxy with 1 to 4 carbon atoms, acyloxy, halogen, especially Cl and Br, carbalkoxy with preferably 1 to 4 carbon atoms in the alkoxy group or by possibly further-substituted phenyl.

Lower alkyl radicals or alkoxy radicals are to be understood to mean those with 1 to 4 carbon atoms.

Preferred alkyl radicals $R_1$ and $R_2$ are those with 1 to 4 carbon atoms. By way of example the following radicals are mentioned:

—$CH_3$, —$C_2H_5$, —$C_3H_7$, —$C_4H_9$.

Acylamino groups are to be understood to mean particularly formylamino, alkylcarbonylamino, phenylcarbonylamino, alkylsulphonylamino and phenylsulphonylamino groups, it being possible for the alkyl and phenyl radicals to be further substituted and the alkyl radicals preferably possess from 1 to 4 carbon atoms.

Suitable acylamino groups are, for example, formylamino, acetylamino, propionylamino, β-chloropropionylamino, butyrylamino, methylsulphonylamino, phenylsulphonylamino, hydroxyacetylamino, phenoxyacetylamino, benzoylamino, p-chlorobenzoylamino, 2,5-dichlorobenzoylamino, phenacetylamino radicals.

As acyloxy groups special mention is made of alkylcarbonyloxy and alkoxycarbonyloxy radicals with 1 to 4 carbon atoms in the alkyl or alkoxy radical.

The alkylene radicals X can also have further substituents, especially hydroxy groups.

Suitable alkylene radicals X are, for example, —$CH_2$—$CH_2$—,

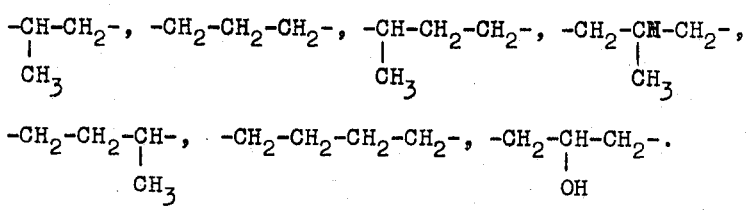

Suitable alkyl radicals $R_3$ and $R_4$ are particularly those with 1 to 4 carbon atoms, such as —$CH_3$, —$C_2H_5$, —$C_3H_7$, —$C_4H_9$, —$CH_2$—$CH_2$—CN, —$CH_2$—$CH_2$—OH, —$CH_2$—$CH_2$—O—$CH_3$, —$CH_2$—$CH_2$—O—CO—$CH_3$, —$CH_2$—$CH_2$—O—CO—$C_2H_5$, —$CH_2$—$CH_2$—O—CO—$C_3H_7$, —$CH_2$—$CH_2$—O—CO—$OCH_3$, —$CH_2$—$CH_2$—O—OC—$OC_2H_5$, —$CH_2$—$CH_2$—O—CO—$OC_4H_9$, —$CH_2$—$C_6H_5$, —$CH_2$—$CH_2$—$C_6H_5$, —$CH_2$—$CH_2$—Cl, —$CH_2$—$CH_2$—COO—$CH_3$, $CH_2$—$CH_2$—$COOC_2H_5$.

Preferred dyestuffs are those of the general formula:

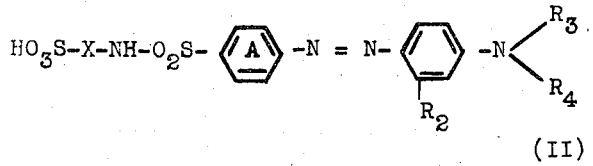

in which $R_2$, $R_3$, $R_4$, A and X have the meanings given in formula (I),
especially those of the formula

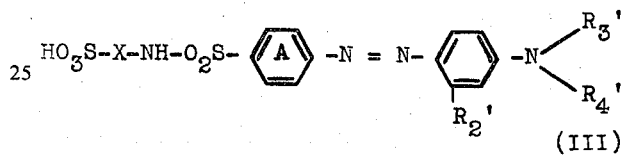

in which X and A have the meaning given above,
$R_2'$ signifies hydrogen or methyl and
$R_3'$ and $R_4'$ signify ethyl, n-propyl or benzyl.

The new dyestuffs are obtained by diazotising 4-aminobenzenesulphonamides of the general formula

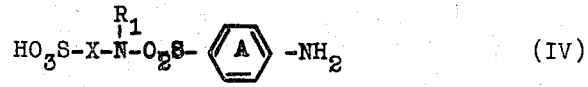

in which X is a straight-chained or branched alkylene radical with 2 to 4 carbon atoms,
$R_1$ signifies hydrogen or an alkyl radical and the nucleus A can possess non-ionic substituents, and is combined with coupling components of the general formula

in which $R_2$ signifies hydrogen, chlorine, an alkyl group or an acylamino group,
$R_3$ signifies hydrogen or alkyl and
$R_4$ signifies alkyl and the nucleus B can also have nonionic substituents.

The diazo components of the general formula (IV) are obtained by amidating 4-acetylaminobenzenesulphochlorides or 4-nitrobenzenesulphochlorides with amines of the formula

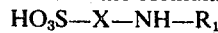

in which X and $R_1$ have the meanings given above, and the acetyl group is converted by saponification or the nitro group is converted by reduction into the amino group.

Suitable 4-aminobenzenesulphonamides of the formula (IV) are for example:

1-amino-4-(N-β-sulphoethyl)-aminosulphonylbenzene
1-amino-4-(N-β-sulphoethyl-N-methyl)-aminosulphonylbenzene
1-amino-2-chloro-4-(N-β-sulphoethyl)-aminosulphonylbenzene
1-amino-2-chloro-4-(N-β-sulphoethyl-N-methyl)-aminosulphonylbenzene
1-amino-3-chloro-4-(N-β-sulphoethyl)-aminosulphonylbenzene
1-amino-3-chloro-4-(N-β-sulphoethyl-N-methyl)-aminosulphonylbenzene
1-amino-2,5-dichloro-4-(N-β-sulphoethyl)-aminosulphonylbenzene
1-amino-2,5-dichloro-4-(N-β-sulphoethyl-N-methyl)-aminosulphonylbenzene
1-amino-2,6-dichloro-4-(N-β-sulphoethyl)-aminosulphonylbenzene
1-amino-2,6-dichloro-4-(N-β-sulphoethyl-N-methyl)-aminosulphonylbenzene
1-amino-2-methyl-3-(N-β-sulphoethyl)-aminosulphonylbenzene
1-amino-2-methyl-4-(N-β-sulphoethyl-N-methyl)-aminosulphonylbenzene
1-amino-2,5-dichloro-4-(N-β-sulphoethyl-N-ethyl)-aminosulphonylbenzene
1-amino-2,5-dichloro-4-(N-γ-sulphopropyl)-aminosulphonylbenzene
1-amino-2,5-dichloro-4-[N-3'-sulpho-n-butyl-(1')]-aminosulphonylbenzene
1-amino-2,5-dichloro-4-[N-4'-sulpho-n-butyl-(1')]-aminosulphonylbenzene Suitable coupling components of the formula (V) are, for example, N,N-diethylaniline, N,N-dipropylaniline, N,N-diethyl-m-toluidine, M-β-cyanethylaniline, N-ethyl-N-β-cyanethylaniline,
N-ethyl-N-β-cyanethyl-m-toluidine, N-ethyl-N-β-hydroxyethylaniline, N-ethyl-n-β-hydroxyethyl-m-toluidine, N-ethyl-N-benzylaniline, N-ethyl-m-tolyl-benzylamine, N-ethyl-N-β-phenylethyl-aniline, N-ethyl-N-β-phenylethyl-m-toluidine,
N-ethyl-N-β-acetoxyethyl-aniline, N-ethyl-N-β-acetoxyethyl-m-toluidine, N,N-di-β-acetoxyethyl-aniline, N-ethyl-N-β-methoxyethyl-aniline, N,N-di-β-methoxyethyl aniline, N-ethyl-β-methoxycarbonylethyl-aniline, N-ethyl-N-β-chloroethyl-aniline,
N-ethyl-N-β-methoxycarbonyloxy-ethyl-aniline, N,N-diethyl-m-acetylamino-aniline.

The dyestuffs according to the invention are suitable for dyeing natural and synthetic fibre materials, especially for dyeing polyamide fibres into level, rich, orange to red shades with very good fastness to light. They are already absorbed very well on to polyamide fibres in the neutral to weakly acid dye bath. Polyamide fibres are to be understood particularly to mean those of synthetic polyamides such as ε-polycaprolactam or condensation products of adipic acid and hexamethylenediamine.

EXAMPLE 1

34.9 Parts of 1-amino-2,5-dichloro-4-(N-β-sulphoethyl)-aminosulphonylbenzene are dissolved in 200 parts of water with caustic soda solution at pH 7, 7.0 parts of sodium nitrite are added, after cooling to 5°C 30 parts of hydrochloric acid (37%) are thrown in and diazotisation is carried out for 15 minutes at 0° to 5°C. After this a solution of 16.3 parts of N,N-diethyl-m-toluidine in 200 parts of 10% hydrochloric acid is added to the clear diazo solution and the coupling which takes place immediately is completed by the addition of sodium acetate. The precipitated dyestuff of the formula:

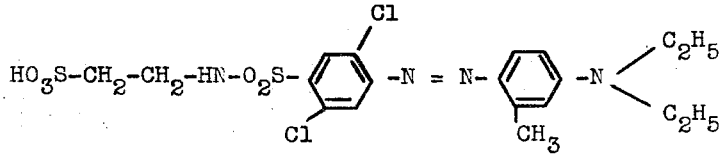

is filtered off with suction and dried. It dyes polyamide fibres and polyamide fabrics from a weakly acid or neutral bath to give a bluish red with very good fastness to light.

If one proceeds as shown in Example 1, but uses as the diazo component the compounds shown in Column I and as coupling component the compounds shown in column II, one also obtains valuable water-soluble diazo dyestuffs which dye polyamide orange to bluish red light-fast shades.

| | I | II | Colour shade on polyamide |
|---|---|---|---|
| 2) | HO$_3$S-CH$_2$-CH$_2$-HN-O$_2$S-C$_6$H$_4$-NH$_2$ | C$_6$H$_5$-N(CH$_3$)$_2$ | Orange |
| 3) | = | C$_6$H$_5$-N(CH$_2$-CH$_2$-CH$_3$)$_2$ | = |
| 4) | = | C$_6$H$_5$-N(C$_2$H$_5$)$_2$ | = |
| 5) | = | 3-CH$_3$-C$_6$H$_4$-N(C$_2$H$_5$)$_2$ | Reddish orange |
| 6) | = | C$_6$H$_5$-N(C$_2$H$_5$)(CH$_2$-C$_6$H$_5$) | Orange |
| 7) | = | 3-CH$_3$-C$_6$H$_4$-N(C$_2$H$_5$)(CH$_2$-CH$_2$-C$_6$H$_5$) | = |
| 8) | HO$_3$S-CH$_2$-CH$_2$-HN-O$_2$S-C$_6$H$_3$(Cl)-NH$_2$ | C$_6$H$_5$-N(C$_2$H$_5$)$_2$ | Scarlet |
| 9) | = | C$_6$H$_5$-N(CH$_2$-CH$_2$-CH$_3$)$_2$ | = |

II—Continued

| I | | | Colour shade on polyamide |
|---|---|---|---|
| 10) | " | -C₆H₄-N(C₂H₅)₂ with CH₃ on ring | Red |
| 11) | HO₃S-CH₂-CH₂-HN-O₂S-C₆H₃(Cl)-NH₂ (3-Cl, 4-NH₂) | -C₆H₄-N(C₂H₅)₂ | Orange |
| 12) | " | -C₆H₄-N(C₂H₅)(CH₂-CH₂-OH) | " |
| 13) | " | -C₆H₃(CH₃)-N(C₂H₅)(CH₂-C₆H₅) | " |
| 14) | HO₃S-CH₂-CH₂-HN-O₂S-C₆H₃(Cl)₂-NH₂ (2,5-Cl, 4-NH₂) | -C₆H₄-N(C₂H₅)₂ | Yellowish red |
| 15) | " | -C₆H₄-N(CH₂-CH₂-CH₃)₂ | " |
| 16) | " | -C₆H₄-NH-CH₂-CH₂-CN | " |
| 17) | " | -C₆H₄-N(C₂H₅)(CH₂-CH₂-OH) | " |
| 18) | " | -C₆H₃(CH₃)-N(C₂H₅)(CH₂-CH₂-OH) | Red |

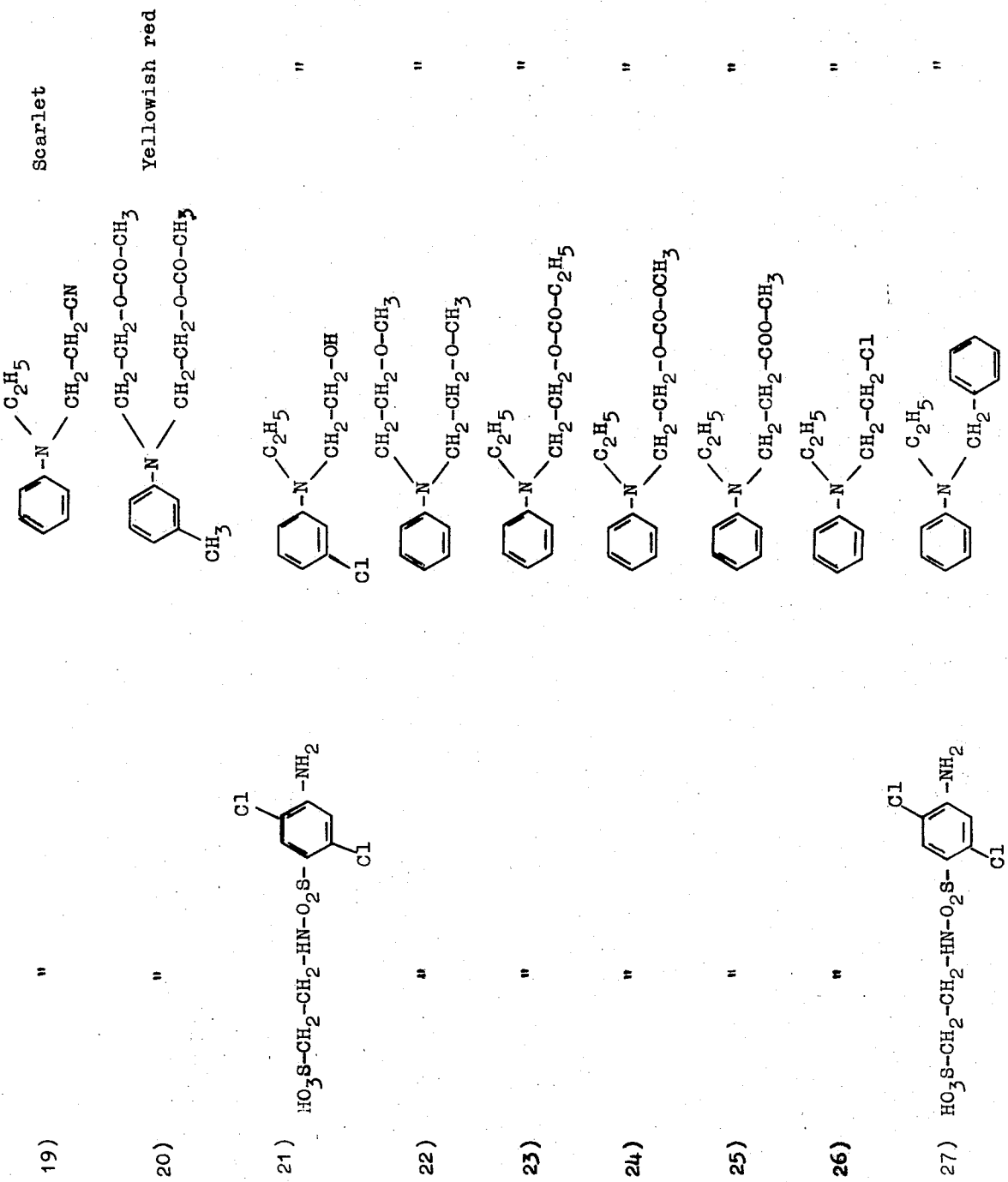

| I | II—Continued | Colour shade on polyamide |
|---|---|---|
| 28) | 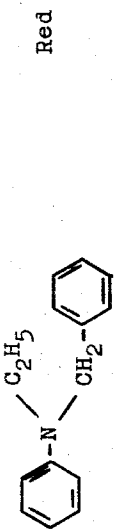 | Red |
| 29) |  | Yellowish red |
| 30) | 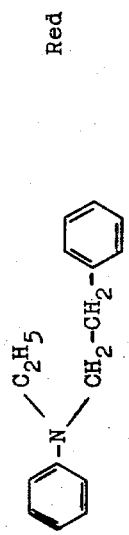 | Red |
| 31) |  | Blueish red |
| 32) | 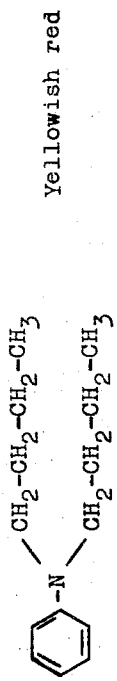 | Yellowish red |
| 33) | 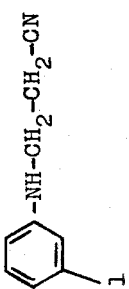 | " |
| 34) $HO_3S-CH_2-CH_2-HN-O_2S-$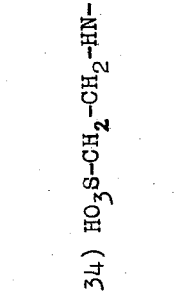 | 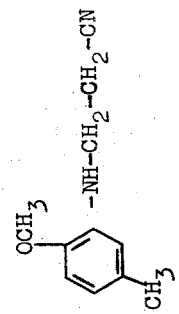 | " |
| 35) " | 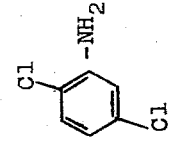 | " |

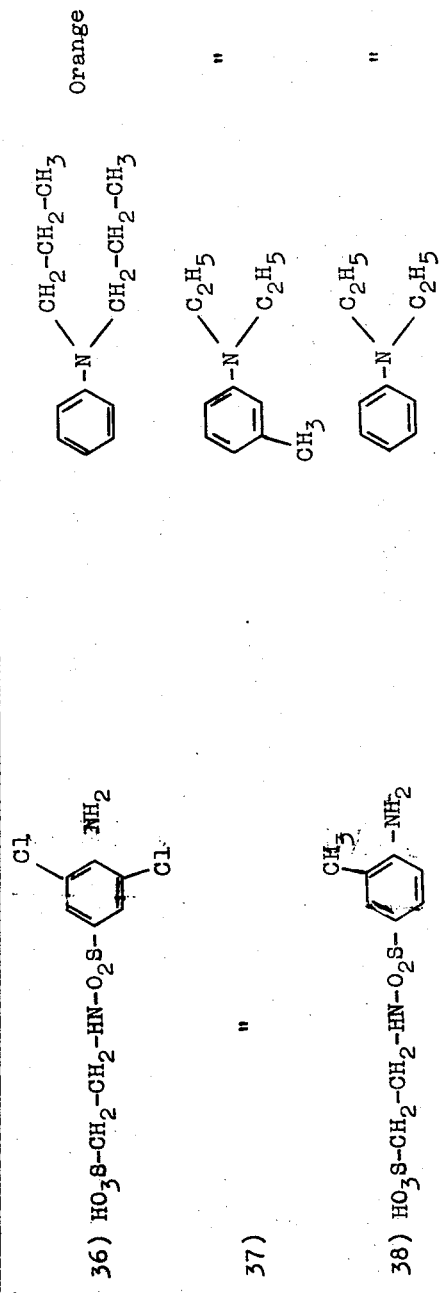
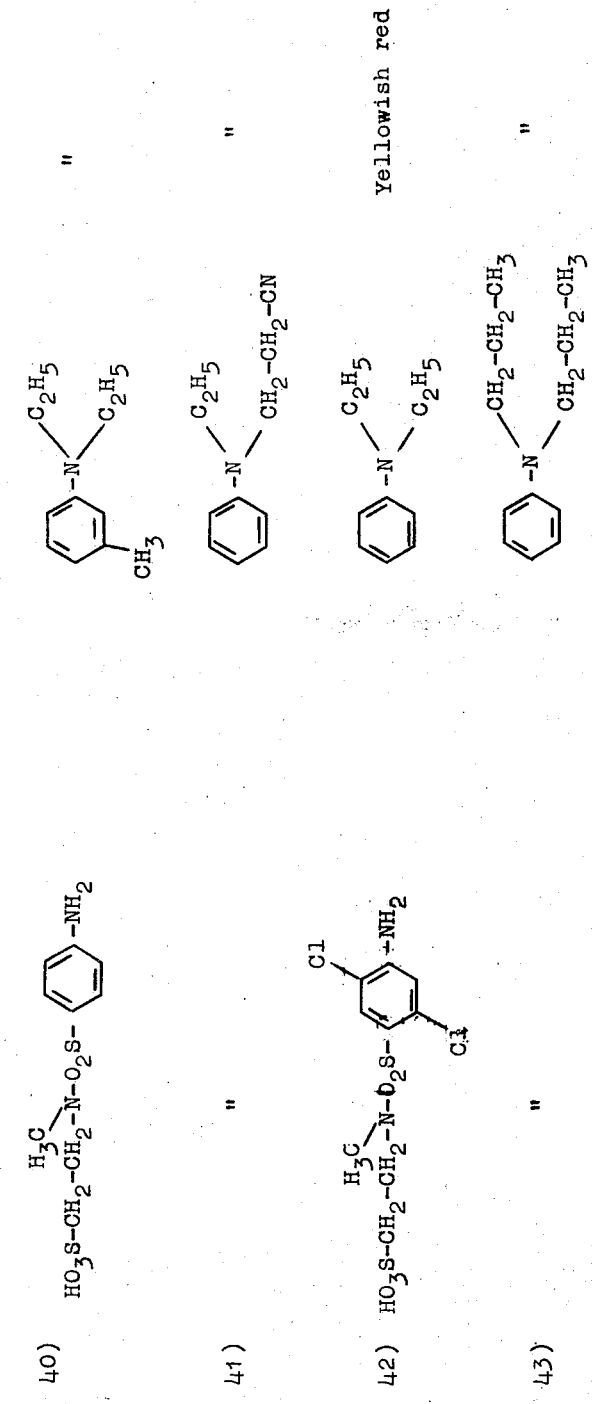

| | I | II—Continued | Colour shade on polyamide |
|---|---|---|---|
| 44) | " | -N(C₂H₅)(C₂H₅), phenyl with CH₃ | Red |
| 45) | " | -N(C₂H₅)(CH₂—phenyl with CH₃) | " |
| 46) | HO₃S-CH₂-CH₂-CH₂-N(C₂H₅)-O₂S— (2,5-Cl₂-4-NH₂-phenyl) | -N(C₂H₅)(C₂H₅), phenyl with CH₃ | " |
| 47) | " | -N(C₂H₅)(CH₂—phenyl) | " |
| 48) | HO₃S-CH₂-CH₂-CH₂-NH-O₂S— (2,5-Cl₂-4-NH₂-phenyl) | -N(CH₂-CH₂-CH₃)(CH₂-CH₂-CH₃), phenyl | Yellowish red |
| 49) | HO₃S-CH(CH₃)-CH₂-CH₂-NH-O₂S— (2,5-Cl₂-4-NH₂-phenyl) | -N(C₂H₅)(C₂H₅), phenyl with CH₃ | " |
| 50) | HO₃S-CH₂-CH₂-CH₂-NH-O₂S— (2,5-Cl₂-4-NH₂-phenyl) | -N(C₂H₅)(C₂H₅), phenyl | Blueish red |

I claim:
1. Monoazo dyestuff, which in the form of a free acid, has the formula

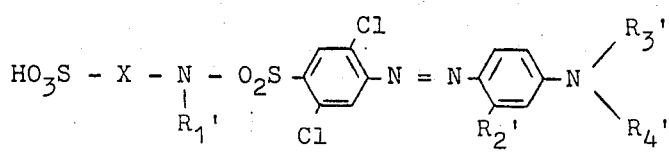

in which X is alkylene with 2 to 4 carbon atoms;

$R_1'$ and $R_2'$ are hydrogen or methyl;

$R_3'$ is methyl, ethyl or propyl; and $R_4'$ is methyl, ethyl, propyl or benzyl.

2. Monoazo dyestuff of claim 1, which in the form of the free acid, has the formula

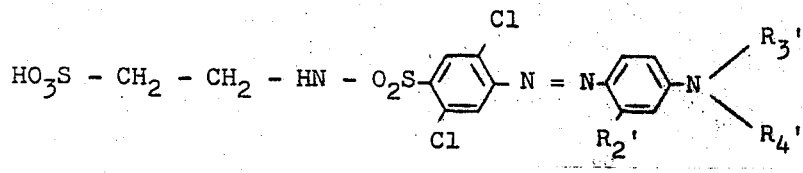

in which $R_2'$ is hydrogen or methyl;

$R_3'$ is ethyl or propyl; and
$R_4'$ is ethyl, propyl or benzyl.

3. Monoazo dyestuff of the formula:

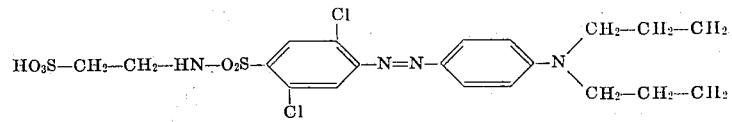

4. Monoazo dyestuff of the formula:

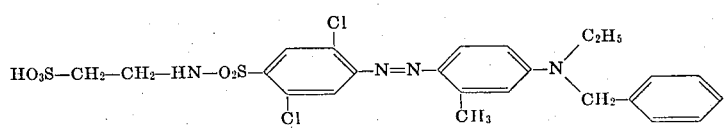

5. Monoazo dyestuff of the formula:

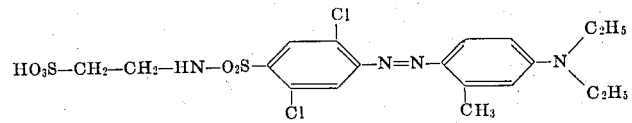

6. Monoazo dyestuff of the formula:

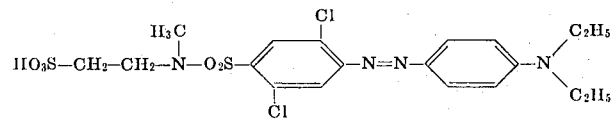

7. Monoazo dyestuff of the formula:

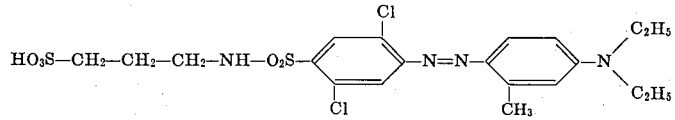

8. Monoazo dyestuff of the formula:

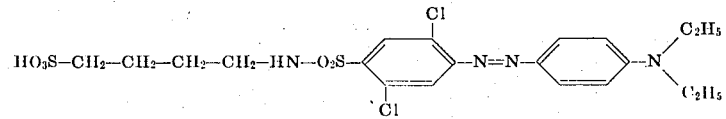

* * * * *